April 12, 1932. H. ROSE 1,853,322
HEATING APPARATUS FOR AUTOMOTIVE VEHICLES
Filed Sept. 22, 1930
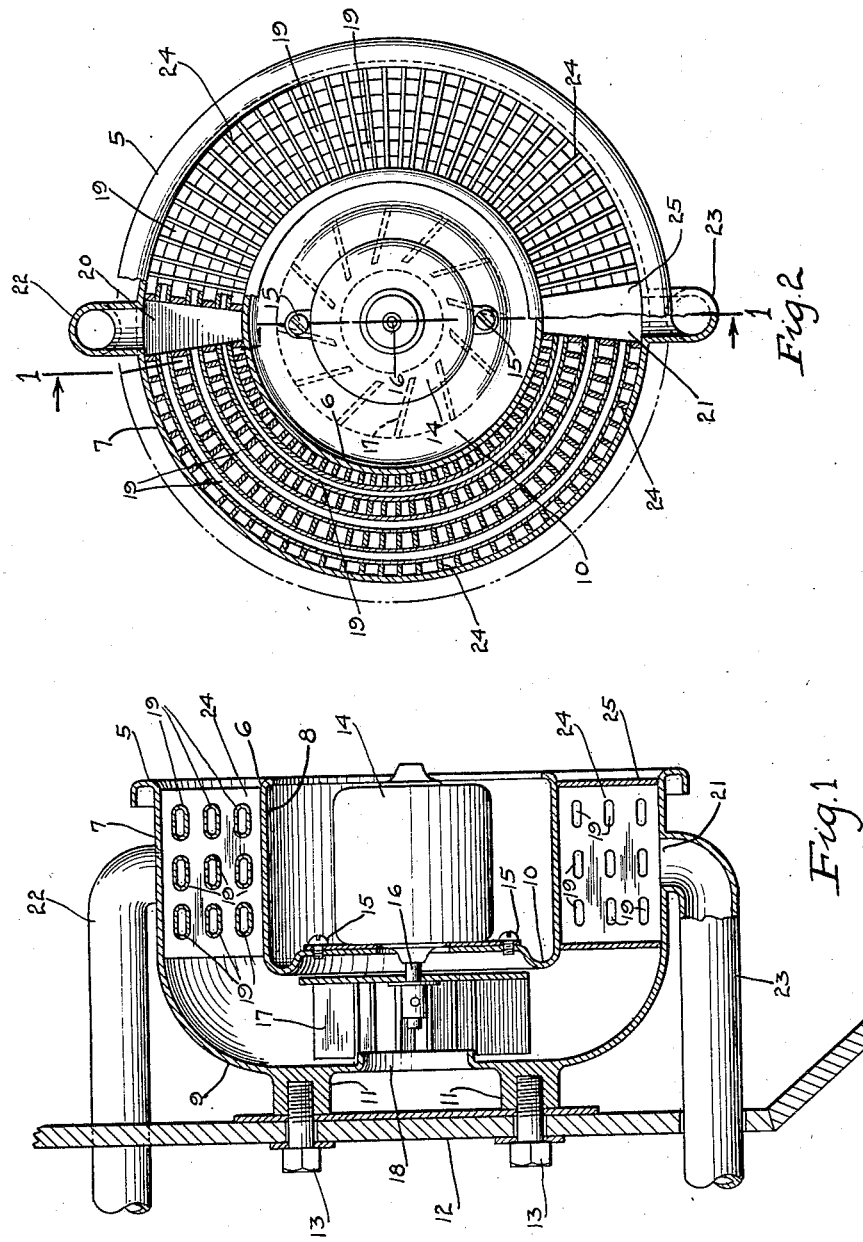
INVENTOR
HARRY ROSE
By Paul, Paul Moore
ATTORNEYS Patented Apr. 12, 1932

1,853,322

UNITED STATES PATENT OFFICE

HARRY ROSE, OF MINNEAPOLIS, MINNESOTA, ASSIGNOR TO TROPIC-AIRE, INC., OF MINNEAPOLIS, MINNESOTA, A CORPORATION OF DELAWARE

HEATING APPARATUS FOR AUTOMOTIVE VEHICLES

Application filed September 22, 1930. Serial No. 483,563.

This invention relates to an apparatus of the type more especially adapted for heating the interior of closed body automative vehicles.

The general object of the invention is to provide an apparatus of the same general nature as that disclosed in Reissue Patent 17,131, granted November 13, 1928, to Tropic-Aire, Inc., assignee of Orville S. Caesar.

The apparatus disclosed in the said patent comprises air-heating and distributing means embodying a liquid receiving chamber communicating with the engine cooling system, said receiving chamber being traversed by air passageways for heating air traveling therethrough by the heated liquid received from the engine cooling system, and means, in connection with the heating and distributing means, to force air within the vehicle body to travel through the liquid receiving chamber and thus become heated, and to keep the heated air in continuous circulation within the vehicle body.

A more specific object of the invention is to provide a heater of the class described comprising inner and outer casing members providing between them a space or chamber in a portion of which is located a heating unit and in another part, an air-circulating unit.

Another specific object of the invention is to provide a heater of generally circular form having heating tubes of arcuate shape connected by means of radially extending fins or partition plates.

Still another specific object of the invention is to provide a heater comprising inner and outer casings having concentric side walls between which is mounted a heating unit and having spaced rear walls between which is mounted an air blower, the rear wall of the outer casing being provided with an air-inlet passage communicating with said blower.

Other objects of the invention and the advantages thereof will be more fully brought out as the description proceeds.

In the accompanying drawings I have illustrated a practical embodiment of my invention, but it is to be understood that I do not limit myself to the details of construction therein disclosed but reserve the right to make such modifications thereof as may come within the scope of the invention as defined in the appended claims.

In these drawings

Fig. 1 is a vertical section through a heater of my invention taken substantially on line 1—1 of Fig. 2; and Fig. 2 is a front view of my heater, parts being broken away to show the interior construction.

Referring now to the drawings, the heater comprises an outer or main casing 5 and an inner casing 6, these being dish-shape and having concentric side walls 7 and 8, respectively, and spaced rear walls 9 and 10.

The outer casing 5 is provided with tapped bosses 11 projecting from the rear wall 9 thereof by means of which the heater may be secured, as a unit, to any convenient part of the vehicle, for example, the dash 12. Suitable securing bolts 13 pass through the dash and into the threaded apertures of the bosses 11. The mounting thus described is only by way of example and it is obvious that the heater may be mounted in any other convenient manner upon any other part of the vehicle.

Within the inner casing 6, I have mounted a motor unit 14 which is secured to the rear wall 10 of the said casing, as by screws 15. The rear wall 10 is provided with a suitable aperture through which passes the shaft 16 of the said motor unit.

Air-circulating means in the form of a centrifugal blower 17 is located in the space between the rear walls 9 and 10 of the casing members and is secured to the shaft 16 of the motor unit. The rear wall 9 of the outer casing member is provided with an air-inlet passage 18 with which the centrifugal blower 17 communicates. It is to be understood, of course, that I do not limit myself to the type of blower shown in the drawings and that any other convenient air-circulating device may be employed.

The heating unit, proper, is located between the concentric side walls 7 and 8 of the casing members and comprises a plurality of arcuate heating tubes 19 arranged concentrically with respect to said casing members. The heating tubes 19 communicate at the top of the heater with a heating medium inlet passage 20 and at the bottom of the heater with an outlet passage 21.

An inlet pipe 22 communicates with the opening 20 for supplying a heating medium thereto. The pipe 22 is connected to the water-circulating cooling system of the engine of the automobile and may be connected to any part of said system, for example, at the top of the radiator of the automobile or at any other point where the cooling medium is relatively hot. A pipe 23 communicates with the outlet opening 21 for conducting the heating medium back to the water-circulating system of the engine. The pipe 23 is connected to the water-circulating system at the water pump, or it may enter into the jacket of the engine cylinders, as may be desired.

A plurality of radial fins or partition plates 24 extend between the concentric walls 6 and 7 of the casing members. These partition plates are provided with apertures through which the arcuate water tubes 19 pass.

The front of the heater is open so that air forced through the spaces between the fins or partition plates 24 may enter the body of the vehicle, as will be well understood. The inlet and outlet passages 20 and 21 are provided with suitable cover plates 25 which close off these passages.

By the foregoing arrangement it will be seen that a heating medium, for example hot water, passing through the pipe 22 will enter the inlet passage 20. The heating medium then circulates through the heating tubes 19 and is discharged into the outlet passage 21, whence it is conducted through the pipe 23 back to the water-circulating system of the automobile.

In operation, the blower 17 is rotated by the motor 14 with the result that air is drawn into the space between the casings 5 and 6 through the air-inlet passage 18 and is forced outwardly from the space between said casings through the spaces between the partition plates 24. The air in passing around the partition plates 24 is, of course, heated by reason of the presence of hot water in the tubes 19 and is thus directed into the body of the vehicle in heated condition. The arrangement, therefore, maintains a constant circulation of air in the body of the vehicle in the course of which circulation, the air is heated by passing through the heater, proper.

I claim as my invention:

1. In a heater for automotive vehicles, a pair of concentric casings, radially extending plates connecting said casings and provided with apertures, and arcuate heating tubes passing through said apertures.

2. In a heater for automotive vehicles, a pair of concentric casings, radially extending plates connecting said casings and provided with apertures, arcuate heating tubes passing through said apertures, and means for supplying a heating medium to said tubes and for withdrawing it therefrom.

3. In a heater for automotive vehicles, a pair of concentric casings, partition plates extending between said casings and forming inlet and outlet passages for a heating medium, and heating tubes concentric with said casings communicating with said inlet and outlet passages.

4. In a heater for automotive vehicles, a pair of concentric casings, partition plates extending between said casings and forming inlet and outlet passages for a heating medium, heating tubes concentric with said casings communicating with said inlet and outlet passages, and radially extending fins connecting said tubes and said casings.

5. In a heater for automotive vehicles, a pair of concentric casings, partition plates extending between said casings and forming inlet and outlet passages for a heating medium, heating tubes concentric with said casings communicating with said inlet and outlet passages, radially extending fins connecting said tubes and said casings, and means communicating with said inlet and outlet passages for introducing a heating medium into said heater and withdrawing it therefrom.

In witness whereof, I have hereunto set my hand this 19th day of September 1930.

HARRY ROSE.